United States Patent [19]

Murayama

[11] 4,109,550
[45] Aug. 29, 1978

[54] STEPLESS SPEED CHANGE SYSTEMS

[75] Inventor: Yoshinobu Murayama, Sakai, Japan

[73] Assignee: Kubota Ltd., Osaka, Japan

[21] Appl. No.: 768,899

[22] Filed: Feb. 15, 1977

[51] Int. Cl.$^2$ .................. F16H 37/06; F16H 47/04
[52] U.S. Cl. ............................................. 74/691; 74/687
[58] Field of Search ............... 74/691, 690, 686, 687, 74/681

[56] References Cited

U.S. PATENT DOCUMENTS

| 2,099,734 | 11/1937 | Hall | 74/691 |
|---|---|---|---|
| 3,194,088 | 7/1965 | Erban | 74/691 |
| 3,739,658 | 6/1973 | Scheiter | 74/691 X |
| 3,866,490 | 2/1975 | Orshansky, Jr. | 74/691 X |
| 4,019,404 | 4/1977 | Schauer | 74/687 |

*Primary Examiner*—Leonard H. Gerin
*Attorney, Agent, or Firm*—Koda and Androlia

[57] ABSTRACT

In a power transmission system in which the torque delivered to an input shaft is transmitted to an output shaft via a planetary gear speed reduction mechanism, a stepless speed change system comprising a stepless speed change mechanism including a disk operatively connected to a gear mounted on the input shaft, a roller in contact with the disk and shiftable diametrically of the disk in a direction intersecting the axis of rotation of the disk, and a handle lever for shifting the roller, the roller being rotatable by the disk in a positive or reverse direction or stoppable when positioned at the center of rotation of the disk; and a worm and a worm wheel for transmitting the positive or reverse rotation of the roller to an internal gear of the planetary gear mechanism. When the output shaft is subjected to a load, part of the resulting counteracting torque is fed to the input shaft through the stepless speed change mechanism.

13 Claims, 11 Drawing Figures

STEPLESS SPEED CHANGE SYSTEMS

BACKGROUND OF THE INVENTION

The present invention relates to power transmission systems employing planetary speed reduction means, and more particularly to stepless speed change systems incorporating means operatively associated with the reduction means and adapted to transmit the torque of an input shaft to an output shaft with stepless speed change.

Stepless speed change systems are used as power transmission systems for agricultural, civil engineering and construction tractors, motor vehicles, tillers, combine harvesters and various other industrial machines.

Heretofore known as stepless speed change systems are hydraulic systems comprising a hydraulic pump and a hydraulic motor and mechanical gear systems. Hydraulic systems adapted for the transmission of great torque are expensive and inefficient, require special high-precision machining techniques and are prone to troubles due to the presence of extraneous solids in the oil.

On the other hand, conventional mechanical stepless speed change systems have a low torque transmitting capacity, involve noticeable slippage leading to inaccurate torque transmission and have structural limitations resulting in difficulties in making the overall system compact and inexpensive. Accordingly, it is difficult to install the mechanical system in tractors and like vehicles within the limited space of the housing.

SUMMARY OF THE INVENTION

An object of this invention is to provide an efficient stepless speed change system of the existing mechanical type which is capable of transmitting great torque with accuracy and which is serviceable also as speed reduction means.

Another object of this invention is to provide a stepless speed change system which is inexpensive and compact in its entirety and which consists generally of planetary speed change means with a minor modification made thereto but without necessitating any special machining technique.

Another object of this invention is to provide a stepless speed change system in which when the output shaft is loaded during the operation of the planetary speed reduction means, part of the torque resulting from the reaction of the internal gear of the means is fed back to the input shaft by way of stepless speed change means so as to preclude the reduction in the efficiency which otherwise would take place.

Still another object of this invention is to provide a stepless speed change system which is serviceable as a propelling power transmission system for tractors by fulfilling the speed requirements suitable for various working implements, ground conditions and agricultural working practice and also assuring ease of speed change and a live PTO function.

These and other advantages and features of this invention will become apparent from the following description.

DETAILED DESCRIPTION OF THE INVENTION

Figure 1:
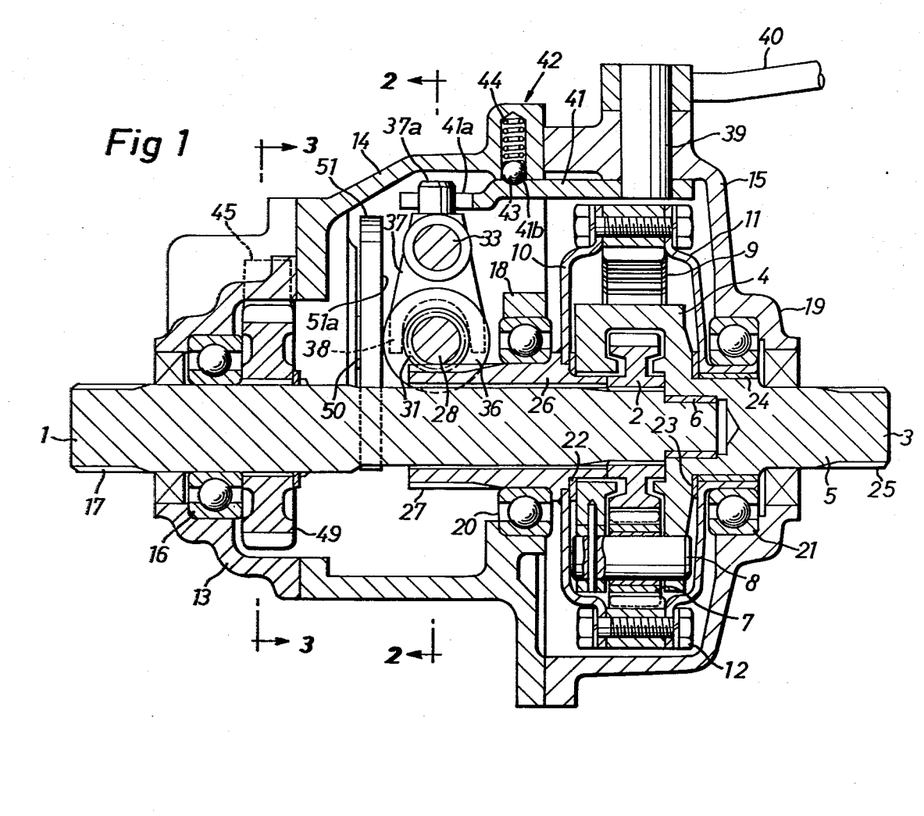
FIG. 1 is an overall side elevation in section showing a stepless speed change system according to this invention.

With reference to FIG. socket-and-spigot an input shaft 1 carries a sun gear 2 splined to its one end. An output shaft 3 includes a bowl-shaped portion 4 and a shaft portion 5 axially in alignment with the input shaft 1. The end of the input shaft 1 fits in the output shaft 3 in the form of a socked-and-spigot joint, with a bearing member 6 such as a bush or needle bearing interposed therebetween. The input shaft 1 and the output shaft 3 are therefore rotatable relative to each other. A planetary gear 7 is freely rotatably mounted on a pin 8 and housed in the bowl portion 4 of the output shaft 3. A plurality of like planetary gears 7 are provided, each in meshing engagement with the sun gear 2.

An internal gear 9 concentric with and surrounding the input shaft 1 and output shaft 3 meshes with the planetary gears 7. Thus, the planetary gears 7 are rotatable about their own axes and also revolvable in known manner.

A pair of reduction cases 10 and 11 are each in the form of a bowl and clamp the internal gear 9 therebetween. The cases 10 and 11 and the internal gear 9 are tightly held together by fasteners comprising bolts and nuts.

Housings 13, 14 and 15 surround and support the entire power transmission system. The input shaft 1 is supported by a ball bearing 16 on the first housing 13 and has a spline portion 17 projecting outward from the first housing 13. The engine power can be transmitted to the input shaft 1 by a gear fitted to the spline portion 17 or by another shaft connected to the portion 17 with a coupling. The pair of reduction cases 10 and 11 are supported by a ball bearing 20 on an annular wall 18 formed in the interior of the second housing 14 and by another ball bearing 21 on a cylindrical boss portion 19 of the third housing 15. The output shaft 3 is made rotatable relative to the cases 10 and 11 by thrust bearings 22 and 23 and a bearing 24, such as a bush or needle bearing, which are provided therebetween. The outer end of the output shaft 3 is splined as at 25. The spline portion 25 projects outward from the cylindrical boss portion 19 of the third housing 15 and is fittable to a gear or coupling.

A cylindrical boss portion 26 is secured to one reduction case 10 as by welding and surrounds the input shaft 1 free of interference therewith. The boss portion 26 is supported substantially by the annular wall 18 with the bearing 20 interposed therebetween. The outer peripheral portion of the cylindrical boss portion 26 is toothed to provide a worm wheel 27. Alternatively, the worm wheel 27 may be an independent one which is mounted on the boss portion.

Figure 2:
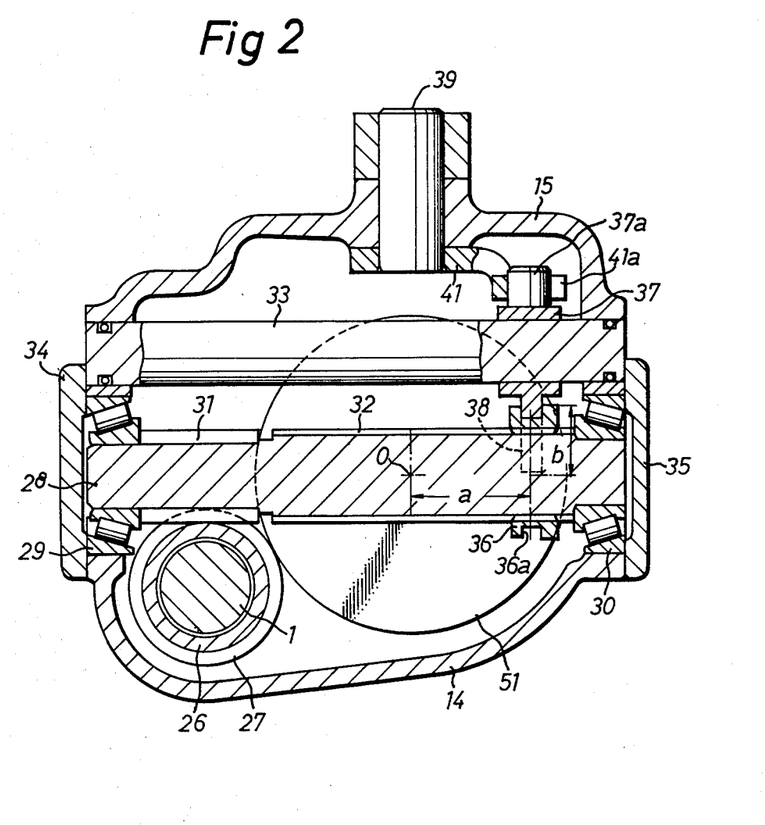
FIG. 2 is an enlarged view in section taken along the line 2—2 in FIG. 1.

As shown in FIG. 2, a worm shaft 28 is supported at its opposite ends by a pair of tapered-roller bearings 29 and 30 on the wall of the second housing 14. The worm shaft 28 has a worm 31 and a spline portion 32. As illustrated in FIGS. 1 and 2, the worm 31 is in mesh with the worm wheel 27. The worm 31 and the wheel 27 constitute second transmitting means. The worm shaft 28 is positioned substantially at right angles to the input shaft 1. A fork shaft 33 extends in parallel to the worm shaft 28 and is supported by the wall of the second housing 14. The fork shaft 33 is restrained from axial displacement by bearing holders 34 and 35 for the worm shaft 28. A roller 36 having a groove 36a in its outer periphery is mounted on the spline portion 32 of the worm shaft 28 and is slidable axially thereof.

A shift fork 37 slidably mounted on the fork shaft 33 has a bifurcated portion 38 engaging in the peripheral groove 36a of the roller 36. A lever support 39 supported by the third housing 15 is turnable about its own axis and is fixedly provided with a handle lever 40 outside the housing 15. Within the housing, a fork lever 41 is secured to the lever support 39. The fork lever 41 extends toward the shift fork 37 and has a bifurcated portion 41a engaging a pin portion 37a on the shift fork 37 as seen in FIG. 1 and 2.

FIG. 1 shows means 42 for setting the output shaft 3 in its zero rotation position. The setting means 42 comprises a ball 43 and a spring 44 for biasing the ball 43, such that the spring 44 forces the ball 43 into a recess 41b in the fork lever 41, whereby the output shaft 3 is settable for zero rotation.

Figure 3:
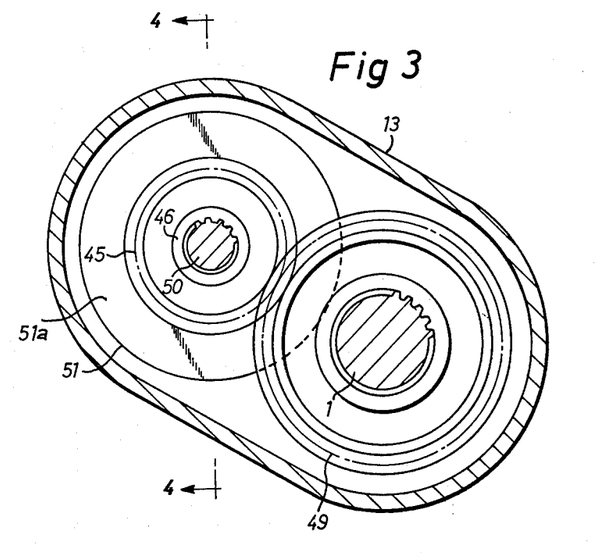
FIG. 3 is an enlarged view in section taken along the line 3—3 in FIG. 1.
Figure 4:
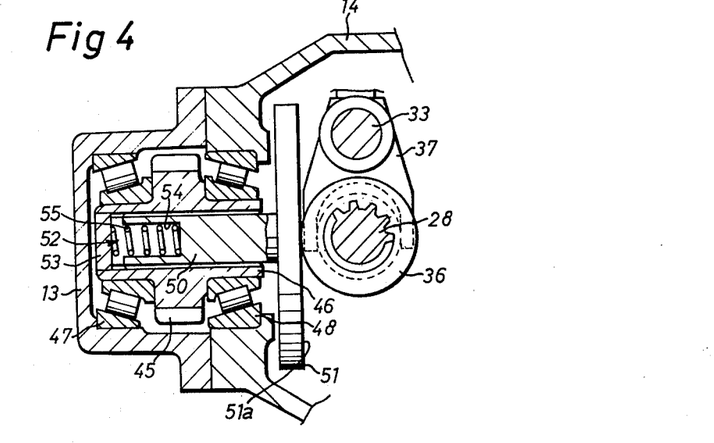
FIG. 4 is a view in section taken along the line 4—4 in FIG. 3.

With reference to FIGS. 3 and 4, a coupling gear 45 in the illustrated embodiment is integral with a tubular shaft 46 splined in its inner surface. The tubular shaft 46 extends in parallel to the input shaft 1 on one side thereof and is rotatably supported by a pair of tapered-roller bearings 47 and 48 on the first and second housings 13 and 14. As shown in FIGS. 1 and 3, a gear 49 is splined to the input shaft 1 and meshes with the coupling gear 45. Thus, the gears 49 and 45 provide first transmitting means to deliver the torque from the input shaft 1 to the tubular shaft 46 with an increased speed. Stated conversely, the gear 49 serves as a reduction gear relative to the gear 45 for the torque feedback operation to be described later. A disk shaft 50 is inserted in and splined to the tubular shaft 46 and is provided with a disk 51 at its one end as shown in FIG. 4. The disk shaft 50 has pressing means 52 for pressing the disk 51 against the roller 36 as shown in FIG. 4. The pressing means 52 in FIG. 4 consists substantially of a closure 53 closing the tubular shaft 46 and a coiled spring 55 accommodated in a cavity 54 in the disk shaft 50. By virtue of the force of the pressing means 52, the outer peripheral surface of the roller 36 is always held in contact with an end surface 51a of the disk 51.

Figure 5:
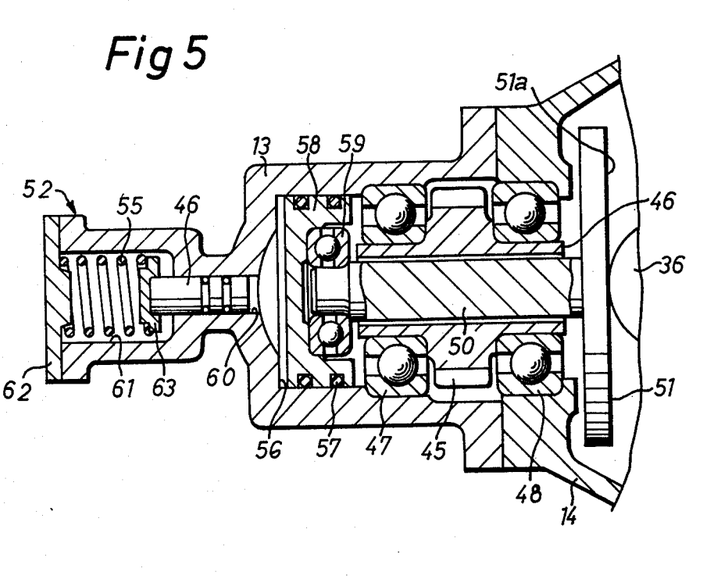
FIG. 5 is a sectional view showing a modification of the means shown in FIG. 4.

FIG. 5 shows hydraulic means serviceable as the disk pressing means 52. The interior of the first housing 13 in FIG. 5 serves as an oil-containing cylinder chamber 56. A piston 58 fits in the cylinder chamber 56, with O-rings 57 ensuring oiltight contact between the piston 58 and the inner surface defining the chamber 56. The piston 58 is slidable axially of the disk shaft 50 and is mounted on the outer end of the disk shaft 50 by means of a thrust bearing 59. The first housing 13 is provided with a plunger chamber 61 with a passage 60 extending between the plunger chamber 61 and the cylinder chamber 56. The plunger chamber 61 has a detachable cover 62. A plunger 64 having a spring seat 63 at its one end is slidably inserted into the passage 60 and biased toward the piston 58 by a coiled spring 55 provided between the cover 62 and the spring seat 63. With the hydraulic pressing means shown in FIG. 5, the force of the spring 55 acts on the plunger 64, which in turn causes the hydraulic piston 58 to exert a pressing force on the disk shaft 50. Because there is no slippage between the roller 36 and the disk 51, the power can be transmitted from each other as will be described later. Thus, without employing a hydraulic pump, constant pressure valve, etc. the hydraulic pressing means can be provided by merely adding plunger 64 and piston 58 to the pressing means of FIG. 4. The cover 62 which is detachable permits the replacement of the spring 55, so that the pressing force of the disk 51 acting on the roller 36 is suitable adjustable.

If the internal gear 9 in the planetary gear speed reduction means included in the embodiment of FIGS. 1 to 4 and comprising the sun gear 2, planetary gears 7 and internal gear 9 is fixed, the speed of rotation $N_1$, of the input shaft 1 will be delivered to the output shaft 3 at a reduced speed of $N_1 \times (Z_1)/(Z_1 + Z_2)$ where $Z_1$ is the number of the teeth of the sun gear 2 and $Z_2$ is the number of teeth of the internal gear 9.

If then the internal gear 9 is driven at a rotational speed of $N_1 \times (Z_1/(Z_1 + Z_2)$ in the reverse direction to the direction of rotation of the input shaft 1, namely of the output shaft 3, the rotational speed of the output shaft 3 will be zero. Further if the internal gear is driven at a rotational speed exceeding $N_1 \times (Z_1)/(Z_1 + Z_2)$, the output shaft 3 will rotate reversely relative to the input shaft 1.

Conversely, if the internal gear 9 is driven at a rotational speed $\alpha$ in the same direction as the input shaft 1, the output shaft 3 will have a rotational speed of $N_1 \times (Z_1)/(Z_1 + Z_2) + \alpha$. To rotate the internal gear 9, the worm 31 on the worm shaft 28 meshes with the worm wheel 27 on the cylindrical boss portion 26 substantially integral with the internal gear 9 as seen in FIGS. 1 and 2. The roller 36 splined to the worm shaft 28 and slidable axially thereof is kept in contact with the end face 51a of the disk 51 which is urged by the pressing means 52 and which is rotatable with the coupling gear 45. The gear 45 in turn meshes with the reduction gear 49 on the input shaft 1. Thus, the disk 51 is rotatable about its axis by way of the gears 45 and 49.

Now during operation of the system, the handle lever 40 is manipulated to cause the fork lever 41 to slidingly move the shift fork 37 along the fork shaft 33, which in turn slides the roller 36 on the worm shaft 28. When the roller 36 is thus positioned at the center of rotation, 0, of the disk 51 (see FIG. 2), the rotational speed of the roller 36 will be zero, with the result that the internal gear 9 is held stationary, permitting the output shaft 3 to rotate at a reduced speed of $N_1 \times (Z_1/(Z_1 + Z_2)$. As the roller 34 moves away from the center of rotation of the disk 51 by a distance $a$, the roller 36 rotates at an increased speed of $N_2 \times (a/b)$ where $N_2$ is the rotational speed of the disk 51 and $b$ is the radius of the roller, see FIG. 2. The direction of rotation of the roller 36, when the roller is positioned on one of the left and right sides of the center 0 of rotation of the disk 51 in FIG. 2, is reversible when the roller is then shifted to the other side. Stated more specifically, the internal gear 9 is held stationary or driven in the same direction as or reverse direction to the output shaft 3, depending on where the roller 36 on the worm shaft 28 is positioned relative to the disk 51. Moreover, the internal gear 9 is rotatable with stepless variation in speed as the amount of movement of the roller 36 is altered. As a result, the output shaft 3 is rotatable in the positive or reverse direction with stepless speed change or can be held stationary.

On the other hand, when the output shaft 3 is subjected to a load, the internal gear 9 will have torque acting in the reverse direction to the input shaft 1 due to the resulting counterforce or reaction. By way of the worm wheel 27 and worm 31, the torque rotates the worm shaft 28, namely the roller 36 on the worm shaft 28. To compensate for a reduction in the speed of the output shaft 3, the roller 36 gives the torque to the disk 51 in frictional contact therewith. The torque it returned to the input shaft 1 via the disk shaft 50, tubular shaft 46 and gears 45 and 49 which are operatively related to serve as feedback means. In this way, part of the torque due to the reaction of the internal gear 9 is fed back to the input shaft 1, affording the corresponding increment to the torque of the output shaft 3 and thereby preventing a reduction in the efficiency.

Although the torque transmission between the disk 51 and the roller 36 is effected only by frictional force, the pressing means 52 employing the coiled spring 55 achieves satisfactory torque transmission without permitting slippage between the disk 51 and the roller 36, if the speed increase ratio between the worm 31 and the worm wheel 27 is set at a value of at least 10.

When the pressing means shown in FIG. 5 is employed for this purpose in which the force of the coiled spring 55 acts on the plunger 64 which in turn hydraulically presses the piston 58, a more effective pressing force is applicable to the disk 51.

Figure 6:
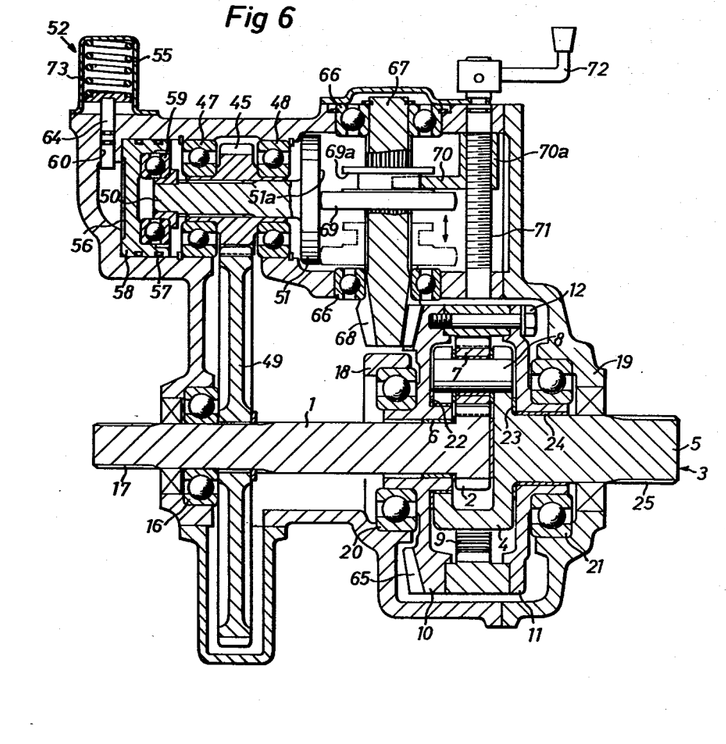
FIG. 6 is an overall side elevation in section showing another embodiment of the stepless speed change system.

FIG. 6 shows an improved embodiment of this invention which is basically of the same construction as the first embodiment shown in FIG. 1. Accordingly, like parts are referred to by like reference numerals throughout these figures, and differences alone will be described in detail.

The second embodiment includes planetary gear speed reduction means covered with cases 10 and 11. The case 10 is toothed in its outer surface to provide a bevel gear 65. A drive pinion shaft 67 supported by a pair of ball bearings 66 carries a pinion 68 meshing with the bevel gear 65. The drive pinion shaft 67, corresponding to the worm shaft 28 in FIG. 1, carries a slidable roller 69 splined thereto. Means comprising a shift fork 70, a screw rod 71 and a handle lever 72 is provided to slidingly shift the roller 69 on the drive pinion shaft 67 axially thereof. The screw rod 71 extends in parallel to the drive pinion shaft 67 and is rotatably supported by the housing of the system. The shift fork 70 has a boss portion 70a which is screwed on the screw rod 71. The handle lever 72 is disposed outside the housing. The shift fork 70 has a bifurcated portion engaging in a peripheral groove 69a in the slidable roller 69. When the handle lever 72 is turned in the positive or reverse direction about the axis of the screw rod 71, the shift fork 70 is moved on the screw rod 71 in screwthread engagement therewith, with the result that the fork 70 in engagement with the slidable roller 69 reciprocally moves the roller 69 on the drive pinion shaft 67 as shown in FIG. 6. Thus, the slidable roller 69 in contact with the end face 51a of a disk 51 is shiftable toward or away from the center of rotation of the disk 51 on either side of the center. The means for pressing the disk 51 against the slidable roller 69 shown in FIG. 6 is similar to the one shown in FIG. 5 wherein the force of the coiled spring 55 is delivered to the plunger 64, which further hydraulically acts on the piston 58. In both FIGS. 5 and 6, like parts are referred to by like reference numerals. The pressing means of FIG. 6 differs from that of FIG. 5 in that whereas the plunger 64 is axially in alignment with the disk shaft 50 in FIG. 5, the plunger 64 of FIG. 6 is positioned at a right angle with the disk shaft 50. However, there is no difference between the two in operation. In FIG. 6, a cap 73 is detachably fixed to the housing by unillustrated bolts or the like to provide a plunger chamber. Further with reference to FIG. 6, a coupling gear 45 is in mesh with a reduction gear 49 on the input shaft 1.

With the embodiment shown in FIG. 6, like the first embodiment shown in FIGS. 1 to 4, the internal gear 9 can be brought to a halt or is rotatable in the same direction as or reverse direction to the input shaft 1 with stepless variation in speed, depending on where the slidable roller 36 is positioned relative to the disk 51, during the torque transmission from the input shaft 1 to the output shaft 3 via the planetary gear speed change means. Similarly, therefore, the output shaft 3 is rotatable in the positive or reverse direction with stepless speed variation or can be halted. However, as compared with the construction of FIGS. 1 and 2, the construction of FIG. 6 is more advantageous. In the case of the former, when part of the torque resulting from the reaction of the internal gear 9 is delivered by way of the worm wheel 27 and worm 31 to the stepless speed change means comprising the roller 36 and the disk 51 and is further fed back to the input shaft 1 via the gears 45 and 49, the feedback operation involves difficulty or inaccuracy due to the automatic locking action between the worm 31 and the worm wheel 27, failing to give an augmented torque at reduced speeds. The construction of FIG. 6 is free of this drawback, since the meshing engagement between the bevel gear 65 and the pinion 68 does not involve any automatic locking action. In addition, the screw-thread mechanism shown in FIG. 6 for shifting the roller 69 renders the handle lever smoothly turnable with a reduced force. Although the bevel gear 65 is integral with the case 10 in FIG. 6, an independent bevel gear is alternatively usable, in which case the gear 65, cases 10, 11 and internal gear 9 may be fastened together by bolts 12. Nevertheless, the gear 65 formed integrally with the case 10 as illustrated is advantageous in that the structure can be made compact with a reduced number of parts.

Figure 7:
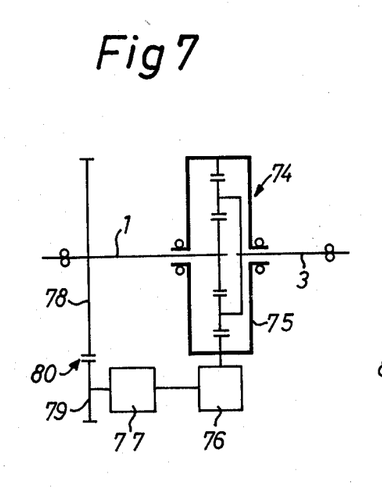
FIG. 7 is a diagram schematically illustrating a system of this invention which employs a hydraulic system comprising a hydraulic pump and a hydraulic motor.
Figure 8:
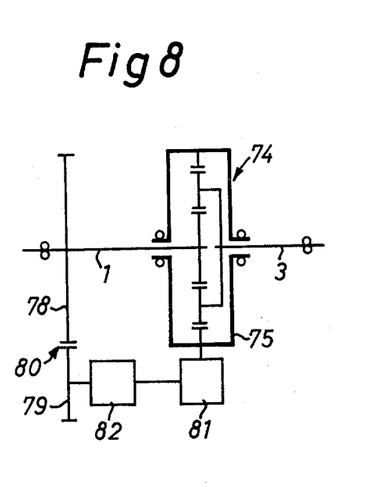
FIG. 8 is a diagram schematically illustrating a system of this invention which employs an electric system comprising a dynamo and a motor.

Whereas the embodiments of FIGS. 1 to 6 include frictional, stepless speed change means comprising a disk and a slidable roller in contact therewith, such means is replaceable with a hydraulic system or electric system schematically shown in FIG. 7 or 8.

The hydraulic system shown in FIG. 7 incorporates planetary gear speed reduction means 74 provided between an input shaft 1 and an output shaft 3 and having a case 75. The case 75, when rotated, drives a hydraulic pump 76 which is operatively connected to a variable hydraulic motor 77. The output of the motor 77 is fed to the input shaft 1 via coupling means 80 comprising gears 78 and 79. It will be apparent to one skilled in the art that the hydraulic pump 76, which is freely controllable, produces the same effect as the means wherein a slidable roller is shiftable relative to a disk.

With the system shown in FIG. 8, the hydraulic pump is replaced by a dynamo 81 which is coupled to a motor 82. This system gives the same effect as above. Throughout FIGS. 7 and 8, like parts are referred to by like reference numerals.

According to the present invention described, a stepless speed change system can be provided which is compact in its entirety and capable of transmitting great torque with high efficiency, merely by modifying part of planetary gear speed reduction means. The stepless speed change means is provided between the first transmitting means and second transmitting means coupled to the planetary speed reduction means, permitting the torque from the input shaft to be transmitted to the disk shaft with an increased speed for stepless speed change by the cooperation of the disk and the roller. The stepless speed change means does not involve any slippage which otherwise would produce a noticeable influence on efficiency. Reduced efficiency can be avoided even when the output shaft is loaded, because part of the torque due to the reaction of the internal gear is fed back to the input shaft via the stepless speed change means.

Figure 9:
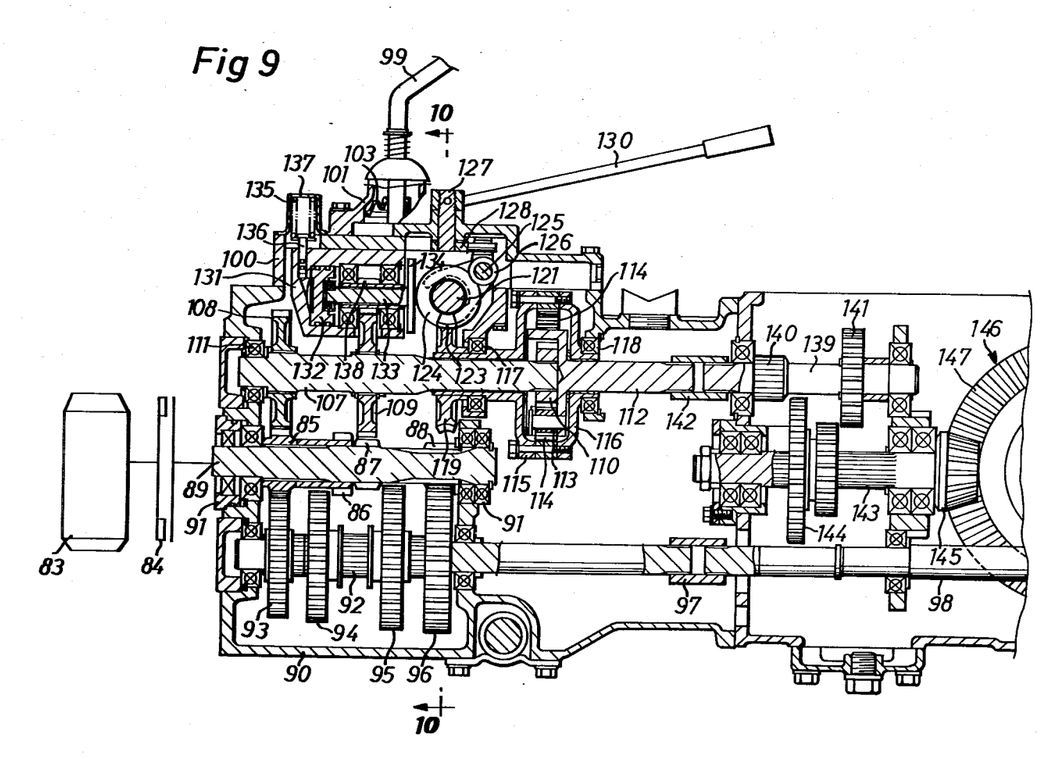
FIG. 9 is a side elevation in section showing a tractor transmission in which a stepless speed change system of this invention is employed as a tractor propelling system.
Figure 10:
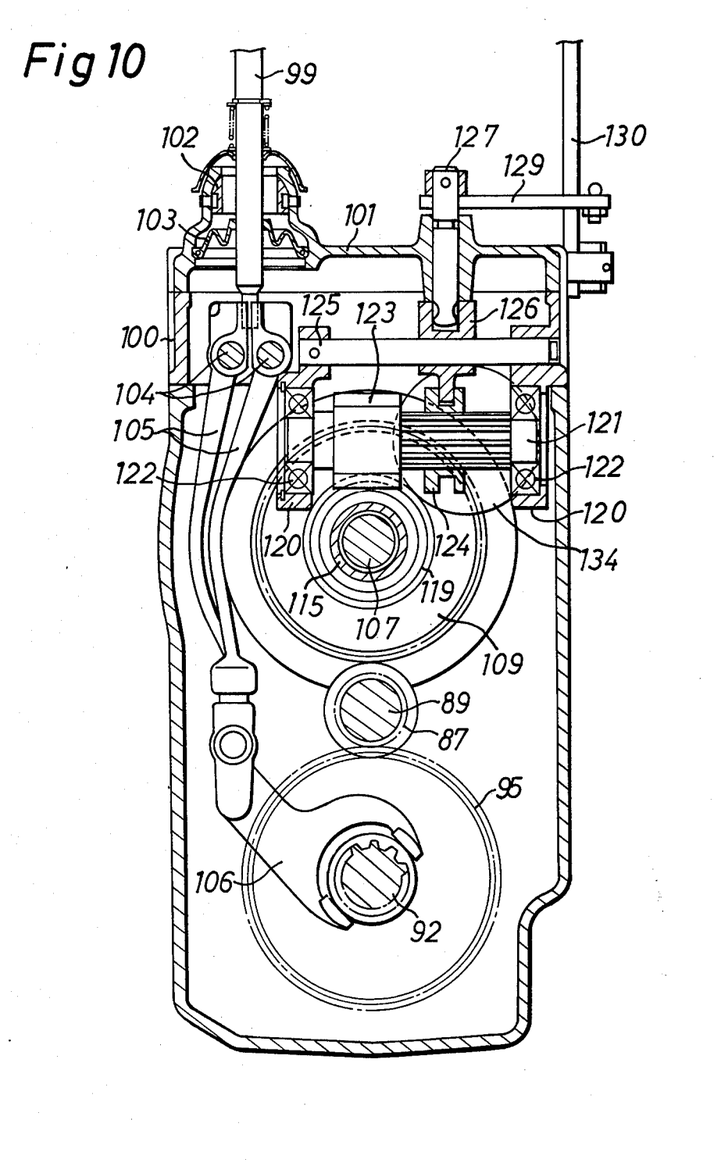
FIG. 10 is a view in section taken along the line 10—10 in FIG. 9.

FIGS. 9 and 10 show a preferred embodiment of the stepless speed change system of this invention as incorporated into a tractor propelling transmission system. The application of this invention to tractors results in various advantages as will be apparent from the embodiment which will be described below for illustrative purposes. Similarly, the present invention is useful in tillers, comine harvesters, motor vehicles and other industrial machines.

FIGS. 9 and 10 show an engine 83, an engine clutch 84 and a main shaft 89 carrying four power transmitting gears 85, 86, 87 and 88. The engagement or disengagement of the clutch 84 effects or interrupts the transmission of the engine power to the main shaft 89.

The main shaft 89 is rotatably supported by bearings 91 on a transmission case 90. A propelling power transmitting system and a PTO power transmitting system are disposed on the upper and lower sides of the main shaft 89 respectively in parallel to the shaft 89.

The PTO power transmitting system comprises a speed change shaft 92 supported by the transmission case 90 and four speed change gears 93, 94, 95 and 96 mounted side by side on the shaft 92. The change gears 94 and 95 are selectively meshable with the gears 86 and 87 on the main shaft 89. As shown in FIG. 9, the speed change shaft 92 extends and is connected by a coupling 97 to a transmitting shaft 98 such as a PTO shaft or an intermediate shaft for power transmission to the PTO shaft.

With reference to FIGS. 9 and 10, a PTO speed change lever 99 is supported on a frame 101 by a ball joint 102, a flexible seal 103, etc. The frame 101 is detachably mounted on an intermediate case 100 which is installed on the transmission case 90. The lower end of a the speed change lever 99 is engageable with and disengageable from intermediate shift members 105 on shifts shafts 104. The shift members 105 extend downward as seen in FIG. 10 and are connected to shift forks 106 in engagement with the speed change gears 94 and 95 respectively. The lever 99, when manipulated, causes these speed change gears to mesh selectively with the power transmitting gears.

The propelling power transmitting system comprises the speed change means described in detail with reference to FIGS. 1 to 5. FIG. 9 shows an input shaft 107 having a transmitting gear 108 meshing at all times with the gear 85 on the main shaft 89 so as to be positively driven by the power delivered from the gear 85. A gear 109, serviceable for feedback, is splined to an intermediate portion of the input shaft 107, which is provided also with a sun gear 110 at its shaft end. As will be apparent from FIG. 9, the input shaft 107 extends in parallel to the main shaft 89 and is supported at its front end by a bearing 111 on the wall of the transmission case 90. An output shaft 112 extends rearward in alignment with the input shaft 107. Provided between the input shaft 107 and the output shaft 112 is planetary speed reduction means comprising the sun gear 110, planetary gears 113 and an internal gear 114 which are housed in cases 115 and 116. The front and rear portions of these cases are supported by bearings 117 and 118 on the wall of the transmissions case 90.

The case 115 has a cylindrical boss portion fixedly carrying a worm wheel 119. As seen in FIG. 10, the intermediate case 100 is integrally formed with a pair of opposite walls 120 supporting a worm shaft 121 by means of a pair of bearings 122. If the input shaft 107 extends longitudinally of the tractor body, the worm shaft 121 extends transversely thereof and is positioned above the input shaft 107. The worm shaft 121 is formed with a worm 123 meshing with the worm wheel 119. As will be apparent from FIG. 10, the worm shaft 121 has a splined portion carrying a slidable roller 124 formed with a peripheral groove. Disposed above and in parallel to the worm shaft 121 is a fork shaft 125 secured to the walls 120 of the intermediate case 100. A shift form 126 slidably mounted on the fork shaft 125 has a bifurcated portion engaging in the groove of the slidable roller 124.

A lever support 127 turnable about its vertical axis is supported by the frame 101 on the intermediate case 100 and fixedly provided with a fork lever 128 which engages a portion of the shift fork 126 as seen in FIG. 9. Secured to the lever support 127 projecting from the frame 101 is a lever 129 in engagement with a handle lever 130 turnable about a lateral pin. The lever 129 and the handle lever 130 may be integral with each other, insofar as the manipulating force on the handle lever 130 can be delivered to the slidable roller 124.

With reference to FIG. 9, the intermediate case 100 includes in its interior a cylinder housing 131 having a cylinder chamber. A hydraulic piston 132 is oiltightly slidably fitted in the cylinder chamber and connected to one end of a disk shaft 133 by a thrust bearing. The disk shaft 133 is provided at the other end with a disk 134. The slidable roller 124 is in contact with the end face of the disk 134 in a diametrical direction of the disk 134 intersecting the axis of rotation of the disk. A pressing force is hydraulically applied to the disk by means of a spring 135 and a plunger 136. The plunger is housed in a plunger case 137 detachably attached to the intermediate case 100.

The disk shaft 133 is inserted in and splined to a tubular shaft carrying a coupling gear 138 and supported by a pair of bearings. The coupling gear 138 is in mesh with the gear 109 on the input shaft 107 at all times.

FIG. 9 further shows a secondary speed change shaft 139 carrying gears 140 and 141 and connected to the output shaft 112 by a coupling 142. A drive pinion shaft 143 has a shift gears 144 selectively meshable with the gears 140, 141 on the shaft 139 and is provided with a bevel pinion 145 meshing with a bevel gear 147 of differential means 146.

With the embodiment of FIGS. 9 and 10, the transmission of the torque of the engine is effected or interrupted by the engagement or disengagement of the clutch 84. The torque drives the input shaft 107 by way of the gears 85 and 108.

Since the input shaft 107 fixedly carries the gear 109 meshing with the gear 138, the input shaft 107 drives both the gears 109 and 138. Further because the gear 138 is rotatable with the disk shaft 133 which is pressed on by the pressing means, the disk 134 rotates about its axis in contact with the slidable roller 124. Accordingly, when the handle lever 130 is manipulated, causing the slidable roller 124 on the worm shaft 121 to move diametrically of the disk 134 in a direction intersecting the center of rotation of the disk, the internal gear 114 is rotated in the same direction as or reverse direction to the direction of rotation of the output shaft 112 or is stopped with stepless speed change as is the case with the embodiment of FIGS. 1 to 5. On the other hand, when the output shaft 112 is subjected to a load, part of the resulting reaction of the internal gear 114 is fed back to the input shaft 107 by way of the worm wheel 119, worm 123, slidable roller 124, disk 134 and gears 138, 109. Thus, the handle lever 130, when operated, slides the roller 124 on the worm shaft 121 to shift the roller relative to the disk 134 in sliding contact therewith, thereby giving a forward, zero or rearward speed steplessly, while permitting a live PTO operation without the necessity of disengaging the clutch 84. In other words, the speed change shaft 92 continues to rotate free of any change despite changes in the travelling speed whether forward, zero or rearward.

The torque of the output shaft 112, which is rotatable in a positive or reverse direction or stoppable with stepless speed change, is delivered through the drive pinion shaft 143 of the secondary speed change means, differential means 146 and, preferably via final speed reduction means to drive unillustrated drive wheels. With the embodiment of FIGS. 9 and 10, the speed change lever 99, when operated, of course gives varying speeds for the PTO system.

The advantages and features of this invention will be fully apparent from the foregoing detailed description given for illustrative purposes only. It is therefore to be understood that various modifications and alterations are included within the scope of the invention. For example, the planetary gears, sun gear and internal gear of the planetary gear speed reduction means are all replaceable by rollers to provide a planetary speed reduction mechanism. In place of the worm and worm wheel, the second transmitting means may alternatively comprise spur gears or the like.

What is claimed is:

1. In a power transmission system in which the torque delivered to input means is subjected to the desired speed deduction by planetary speed reduction means and then transmitted to output means, a stepless speed change system comprising:
   first transmitting means operatively connected to the input means, said first transmitting means comprising a gear mounted on an input shaft and a gear mounted on a shaft for driving a disk shaft;
   second transmitting means operatively connected to an inner ring of the planetary speed reduction means, said second transmitting means comprising a worm wheel formed on an inner ring and a worm shaft having a worm meshing with the worm wheel; and
   stepless speed change means provided between the first and second transmitting means and including means for operating the stepless speed change system, said stepless speed change means comprising a disk operable by said first transmitting means and provided on the disk shaft and a roller incorporated into the second transmitting means and shiftable diametrically of the disk in a direction intersecting the axis of rotation of the disk, said disk being in contact with an outer surface of the disk and the disk being pressed against the roller by hydraulic pressure, said roller further being mounted on said worm shaft rotatable therewith and shiftably axially thereof;
   whereby when the operating means is operated the torque from the input means is transmitted to the inner ring to cause the inner ring to be halted or to be rotated in a positive or reversed direction with stepless speed change, the torque being transmitted also to the output means to bring the output means to a halt or into positive or reverse rotation with stepless speed change.

2. In a power transmission system in which the torque delivered to input means is subjected to the desired speed deduction by planetary speed reduction means and then transmitted to output means, a stepless speed change system comprising:
   first transmitting means operatively connected to the input means, said first transmitting means comprising a gear mounted on an input shaft and a gear mounted on a disk driving shaft;
   second transmitting means operatively connected to an inner ring of the planetary speed reduction means, said second transmitting means comprising a bevel gear formed directly on or secured to a reduction case for the speed reduction means and a bevel pinion shaft having a bevel pinion meshing with the bevel gear; and
   a stepless speed change means, the stepless speed change means comprises a disk operable by the first transmitting means and coupled to said disk driving shaft and a roller incorporated into the second transmitting means and shiftable diametrically of the disk in a direction intersecting the axis of rotation of the disk, the roller being in contact with an outer surface of the disk and being mounted on a bevel pinion shaft rotatable therewith and shiftably axially thereof;
   whereby when the operating means is operated the torque from the input means is transmitted to the inner ring to cause the inner ring to be halted or to be rotated in a positive or reversed direction with stepless speed change, the torque being transmitted also to the output means to bring the output means to a halt or into positive or reverse rotation with stepless speed change.

3. A stepless speed change system as defined in claim 2 wherein the disk is pressed against the roller by hydraulic pressure.

4. A stepless speed change system as defined in claim 3 wherein the operating means for shifting the roller on the bevel pinion shaft is screw-thread shifting means including at least a shift fork engaging the roller and a screw rod having the shift fork in screw-thread engagement therewith.

5. A stepless speed change system as defined in claim 12 wherein the second transmitting means comprises a bevel gear and a pinion meshing therewith so that when the output shaft is subjected to a load, the resulting reaction is fed back to the input shaft by way of the second transmitting means, the stepless speed change means and the first transmitting means.

6. A stepless speed change system as defined in claim 2 wherein the friction disk is hydraulically pressed against the friction roller by the pressing means.

7. In a tractor transmission including a main shaft having a plurality of power transmitting gears for receiving an engine power by way of a clutch and a propelling power transmitting system and a PTO power transmitting system disposed on the opposite sides of the main shaft respectively to transmit the power with the desired speed change, the propelling power transmitting system including input means for receiving torque from the main shaft and operable to subject the torque to the desired speed reduction by planetary speed reduction means and to thereafter transmit the resulting torque to output means, a stepless speed change system provided for the propelling power transmitting system and comprising:

first transmitting means operatively connected to the input means, said first transmitting means comprising a gear mounted on an input shaft and a gear mounted on a disk driving shaft;

second transmitting means operatively connected to an inner ring of the planetary speed reduction means, said second transmitting means comprising a worm wheel formed on the inner ring and the worm shaft having a worm meshing with the worm wheel; and stepless speed change means provided between the first and second transmitting means and including means for operating stepless speed change means, said stepless speed change means comprising a disk operable by the first transmitting means and coupled to said disk driving shaft and a roller incorporated into said second transmitting means and shiftable diametrically of the disk in a direction intersecting the axis of rotation of the disk, said roller being in contact with an outer surface of the disk and the disk being pressed against the roller by hydraulic pressure, the roller further being mounted on the worm shaft rotatably therewith and shiftable axially thereof.

8. In a power transmission system including an input shaft connected to a sun gear of planetary gear speed reduction means, an output shaft connected to a member for turning a planetary gear of the planetary gear speed reduction means, first transmitting means composed of a group of gears operatively connected to the input shaft, second transmitting means operatively connected to an inner ring of the planetary gear speed reduction means, and stepless speed change means provided between the first and second transmitting means and composed of a friction roller and a friction disk, a stepless speed change system characterized by:

the friction disk being mounted on a shaft parallel to the input shaft, the shaft being axially movably inserted in a hollow gear, the first transmitting means comprising the hollow gear and a transmission gear mounted on the input shaft for the gear to give an increased speed to the hollow gear;

the friction roller being fittingly supported by a shaft or positioned at right angles to the shaft of the friction disk and operatively movable with the inner ring of the planetary gear speed reduction means, the friction roller being associated with operating means by which the roller is shiftable on the shaft or diametrically of the friction disk in contact with the outer surface of the disk; and pressing means provided at one end of the shaft of the friction disk for maintaining the disk in frictional contact with the roller.

9. A stepless speed change system as defined in claim 8 wherein the second transmitting means comprises a bevel gear and a pinion meshing therewith so that when the output shaft is subjected to a load, the resulting reaction is fed back to the input shaft by way of the second transmitting means, the stepless speed change means and the first transmitting means.

10. A stepless speed change system as defined in claim 8 wherein the friction disk is hydraulically pressed against the friction roller by the means.

11. A stepless speed change system as defined in claim 8 wherein the means for operating the friction roller is screw-thread means including at least a shift fork engaging the roller and a screw rod having the fork in screw-thread engagement therewith.

12. A stepless speed change system as defined in claim 8 wherein the second transmitting means comprises a bevel gear formed directly on or secured to a reduction case for the planetary gear speed reduction means and a bevel pinion shaft having a bevel pinion meshing with the bevel gear.

13. In a tractor transmission including a main shaft having a plurality of power transmitting gears for receiving the power of an engine by way of clutch, and a propelling power transmitting system and a PTO power transmitting system disposed on the opposite sides of the main shaft respectively to transmit the power with the desired speed change, the propelling power transmitting system including input means including a gear meshing with a gear on the main shaft and adapted to receive torque from the main shaft, to subject the torque to the desired speed reduction by planetary speed reduction means and to thereafter transmit the resulting torque to output means, a stepless speed change system provided for the propelling power transmitting system and comprising:

an input shaft connected to a sun gear of planetary gear speed reduction means, an output shaft connected to a turning member for turning a planetary gear of the planetary gear speed reduction means, first transmitting means composed of a group of gears operatively connected to the input shaft, second transmitting means operatively connected to an inner ring of the planetary gear speed reduction means, and stepless speed change means provided between the first and second transmitting means and composed of a friction roller and a friction disk;

the stepless speed change system being characterized by:

the friction disk being mounted on a shaft parallel to the input shaft, the shaft being axially movably inserted in a hollow gear, the first transmitting means comprising the gears, and adapted to give an increased speed to the hollow gear;

the friction roller being fittingly supported by a shaft positioned at right angles to the shaft of the friction disk and operatively movable with the inner ring of the planetary gear speed reduction means, the friction roller being associated with operating means by which the roller is shiftable on the shaft diametrically of the friction disk in contact with the outer surface of the disk;

pressing means provided at one end of the shaft of the friction disk for maintaining the disk in frictional contact with the roller; and the planetary gear speed reduction means being accommodated in an upper space within the transmission case to the rear of the main shaft.

* * * * *